US012591568B1

(12) United States Patent
Balagangadhar et al.

(10) Patent No.: US 12,591,568 B1
(45) Date of Patent: Mar. 31, 2026

(54) METHOD, APPARATUS, AND COMPUTER-READABLE MEDIUM FOR DOMAIN-SPECIFIC EXECUTION OF NATURAL LANGUAGE QUERIES

(71) Applicant: INFORMATICA LLC, Redwood City, CA (US)

(72) Inventors: Vishal Balagangadhar, Bangalore (IN); Nobel Ng, Saratoga, CA (US); Zaki Raza, Bangalore (IN); Danny Tseng, Union City, CA (US); Trang Vu, Verona, WI (US)

(73) Assignee: INFORMATICA LLC, Redwood City, CA (US)

( * ) Notice: Subject to any disclaimer, the term of this patent is extended or adjusted under 35 U.S.C. 154(b) by 0 days.

(21) Appl. No.: 19/016,948

(22) Filed: Jan. 10, 2025

(51) Int. Cl.
| | |
|---|---|
| *G06F 16/00* | (2019.01) |
| *G06F 16/242* | (2019.01) |
| *G06F 16/2452* | (2019.01) |
| *G06F 16/248* | (2019.01) |
| *G06F 16/28* | (2019.01) |

(52) U.S. Cl.
CPC ........ *G06F 16/243* (2019.01); *G06F 16/2452* (2019.01); *G06F 16/248* (2019.01); *G06F 16/285* (2019.01)

(58) Field of Classification Search
CPC .. G06F 16/243; G06F 16/2452; G06F 16/248; G06F 16/285
See application file for complete search history.

(56) References Cited

U.S. PATENT DOCUMENTS

| | | | | | |
|---|---|---|---|---|---|
| 8,983,930 | B2 * | 3/2015 | Cheng | ............... | G06F 16/24578 707/723 |
| 11,176,325 | B2 * | 11/2021 | McAteer | ............. | G06F 16/3338 |
| 2011/0035403 | A1 * | 2/2011 | Ismalon | ................ | G06F 16/487 707/769 |
| 2011/0225155 | A1 * | 9/2011 | Roulland | ............ | G06F 16/3325 707/750 |

(Continued)

FOREIGN PATENT DOCUMENTS

CN           120744068 A   * 10/2025

*Primary Examiner* — Noosha Arjomandi
(74) *Attorney, Agent, or Firm* — Reed Smith LLP; Amardeep S. Grewal

(57) ABSTRACT

A method, apparatus, and computer-readable medium for domain-specific execution of natural language queries, the method including receiving a natural language query comprising a plurality of query terms, identifying nouns in the plurality of query terms, querying an entity index based on the nouns to identify class entities corresponding to the nouns and class attributes corresponding to the class entities, generating structured query language (SQL) queries corresponding to the natural language query based on providing the class entities and the class attributes as context to a large language model (LLM), transforming the SQL queries into domain specific language (DSL) queries based on the SQL terms, additional terms semantically related to the SQL terms, and DSL mapping rules configured to map SQL to DSL, executing the DSL query on an enterprise data catalog to identify results corresponding to the natural language query, and transmitting the results in the user interface.

21 Claims, 18 Drawing Sheets

(56)        References Cited

U.S. PATENT DOCUMENTS

| | | | |
|---|---|---|---|
| 2013/0262361 A1* | 10/2013 | Arroyo ............... | G06F 16/3344 |
| | | | 706/46 |
| 2014/0143223 A1* | 5/2014 | Shi ...................... | G06F 16/3322 |
| | | | 707/706 |
| 2016/0103559 A1* | 4/2016 | Maheshwari ......... | G06F 3/0481 |
| | | | 715/738 |
| 2016/0140232 A1* | 5/2016 | Smirnov ............. | G06F 16/3325 |
| | | | 707/768 |
| 2016/0203130 A1* | 7/2016 | Roque ................. | G06F 16/3344 |
| | | | 707/741 |
| 2016/0366036 A1* | 12/2016 | Gupta ................... | G06F 3/0481 |
| 2017/0242913 A1* | 8/2017 | Tijssen ................. | G06F 40/279 |
| 2018/0121500 A1* | 5/2018 | Reschke ............ | G06F 16/2428 |
| 2019/0034500 A1* | 1/2019 | Das ................... | G06F 16/24522 |
| 2019/0042568 A1* | 2/2019 | Balabine ............... | G06F 40/216 |
| 2019/0236215 A1* | 8/2019 | Agarwal ............ | G06F 16/9014 |
| 2020/0210491 A1* | 7/2020 | Hajic ................... | G06F 16/316 |
| 2021/0149963 A1* | 5/2021 | Agarwal .......... | G06F 16/90332 |
| 2021/0191925 A1* | 6/2021 | Sianez .................... | G06N 3/04 |
| 2021/0279264 A1* | 9/2021 | Robert Jose .......... | G06F 40/279 |
| 2021/0280175 A1* | 9/2021 | Robert Jose ......... | G06F 16/243 |
| 2022/0058193 A1* | 2/2022 | Smith ................ | G06F 16/2465 |
| 2022/0327119 A1* | 10/2022 | Gasper ............... | G06F 16/9024 |
| 2025/0028760 A1* | 1/2025 | Latta ..................... | G06F 16/901 |
| 2025/0342322 A1* | 11/2025 | Banerjee ................ | G06F 40/40 |

* cited by examiner

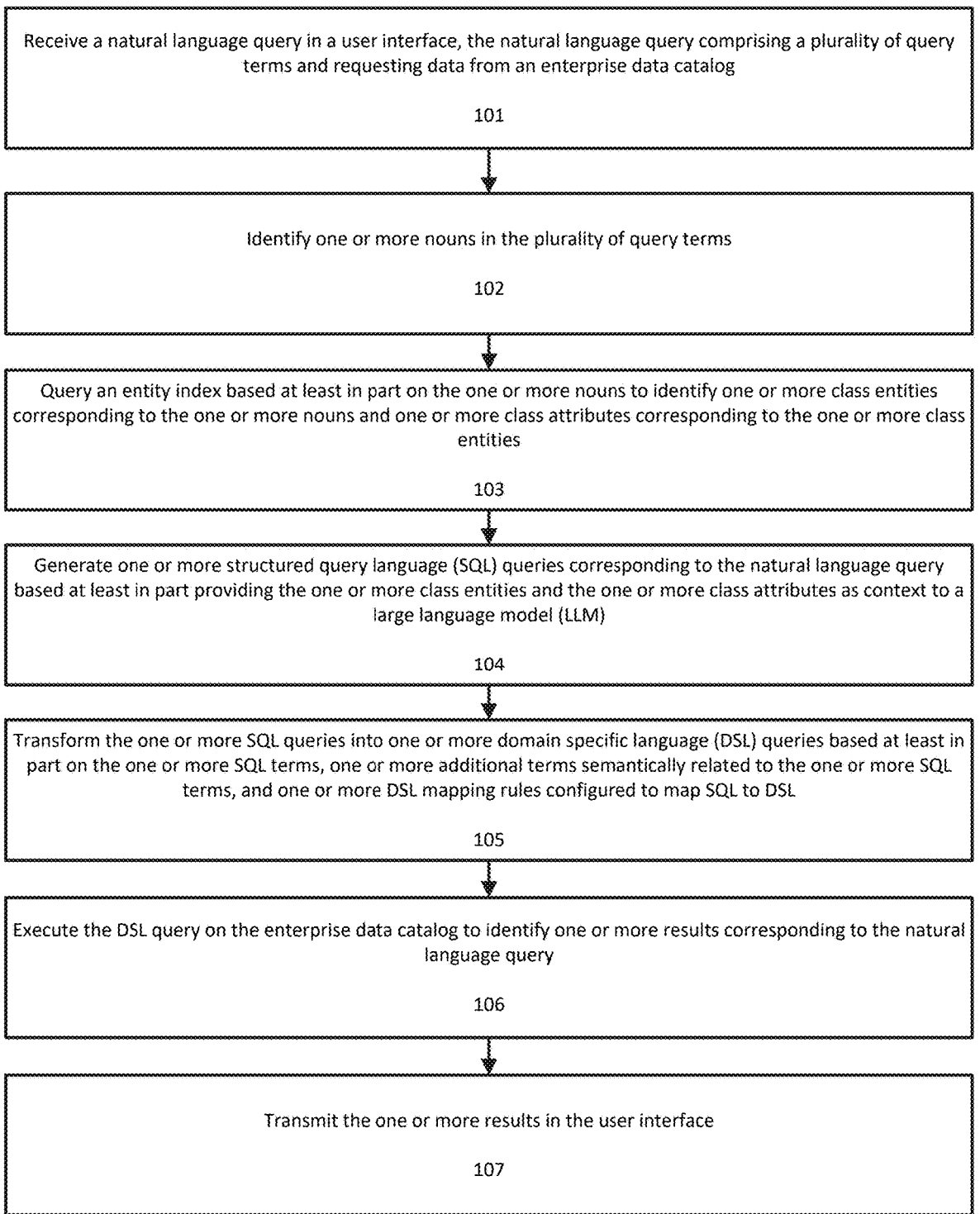

Receive a natural language query in a user interface, the natural language query comprising a plurality of query terms and requesting data from an enterprise data catalog

101

Identify one or more nouns in the plurality of query terms

102

Query an entity index based at least in part on the one or more nouns to identify one or more class entities corresponding to the one or more nouns and one or more class attributes corresponding to the one or more class entities

103

Generate one or more structured query language (SQL) queries corresponding to the natural language query based at least in part providing the one or more class entities and the one or more class attributes as context to a large language model (LLM)

104

Transform the one or more SQL queries into one or more domain specific language (DSL) queries based at least in part on the one or more SQL terms, one or more additional terms semantically related to the one or more SQL terms, and one or more DSL mapping rules configured to map SQL to DSL

105

Execute the DSL query on the enterprise data catalog to identify one or more results corresponding to the natural language query

106

Transmit the one or more results in the user interface

Figure 6:
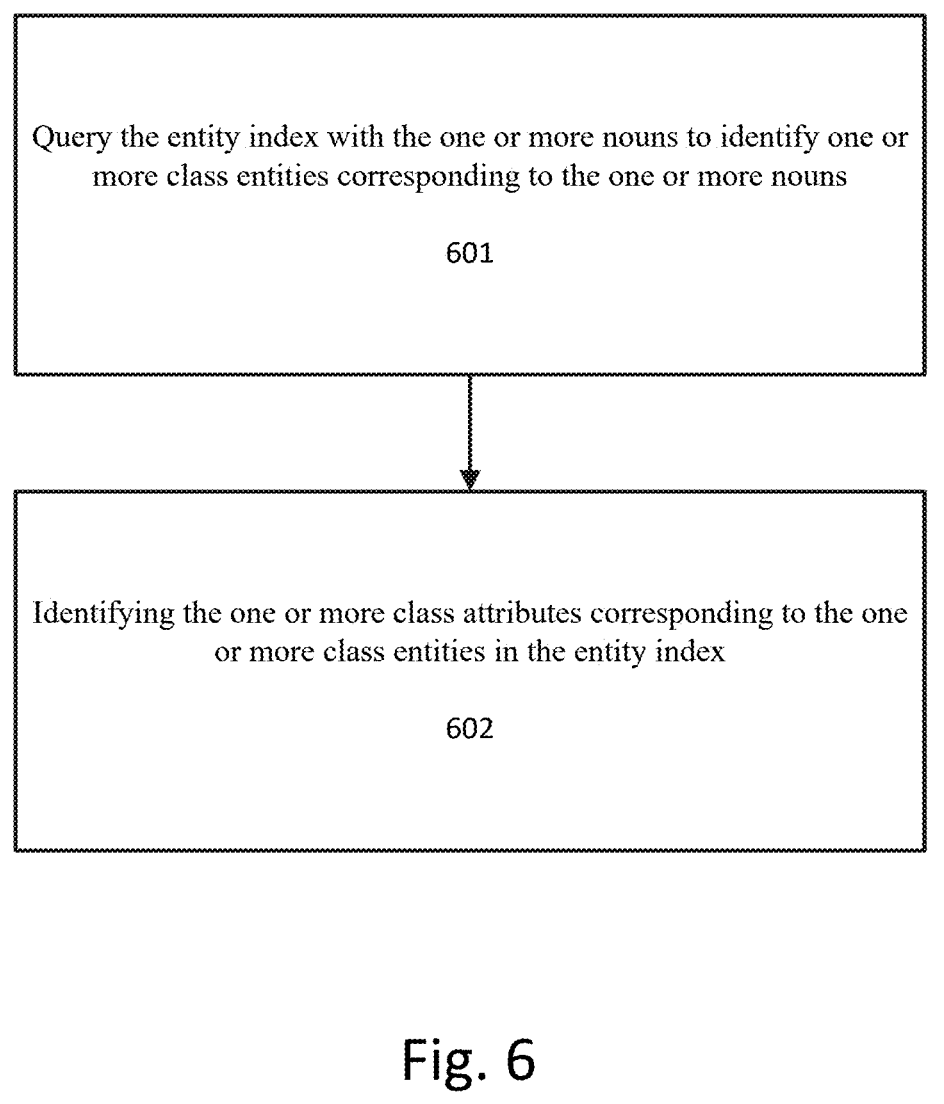

Query the entity index with the one or more nouns to identify one or more class entities corresponding to the one or more nouns

601

Identifying the one or more class attributes corresponding to the one or more class entities in the entity index

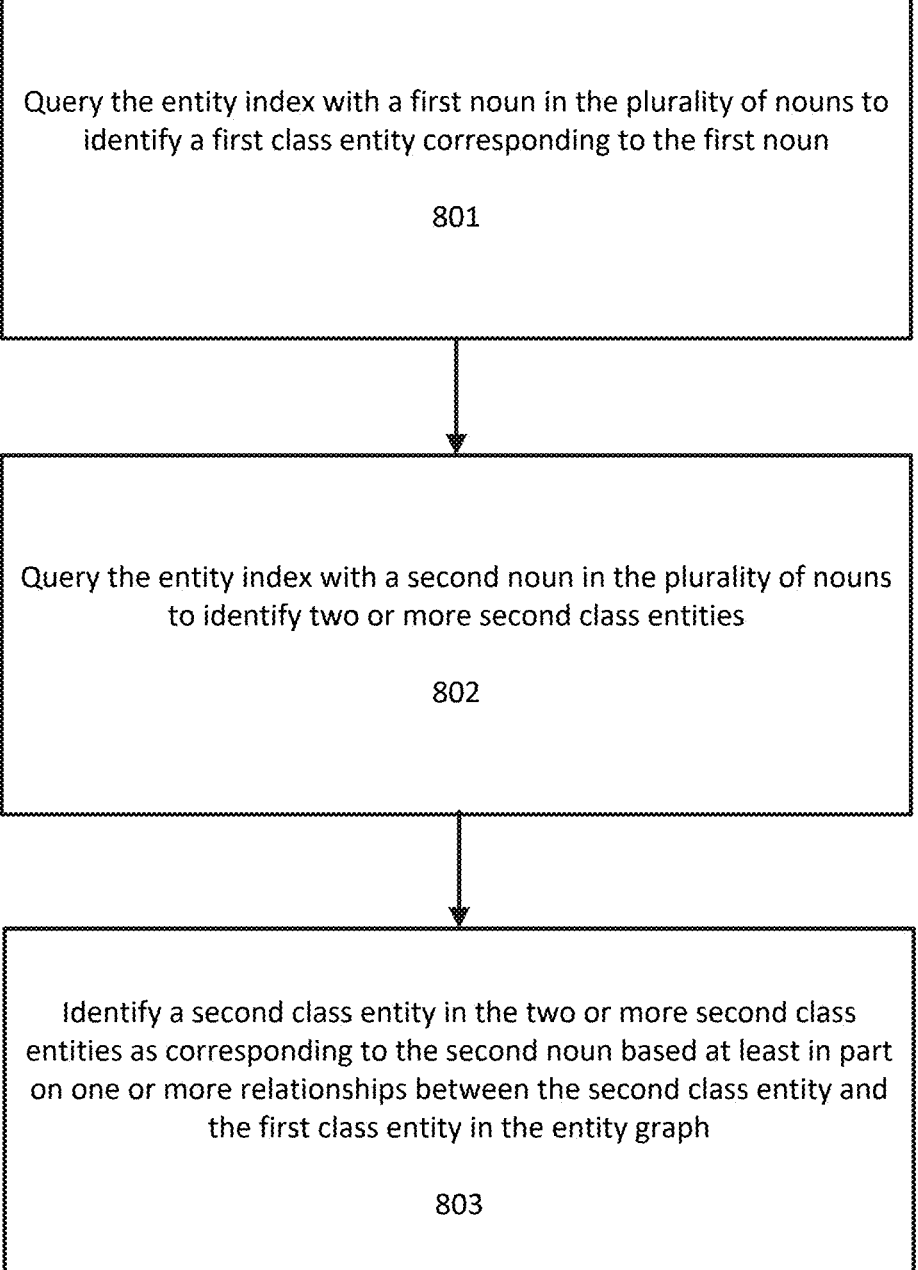

Query the entity index with a first noun in the plurality of nouns to identify a first class entity corresponding to the first noun

801

Query the entity index with a second noun in the plurality of nouns to identify two or more second class entities

802

Identify a second class entity in the two or more second class entities as corresponding to the second noun based at least in part on one or more relationships between the second class entity and the first class entity in the entity graph

Figure 12:
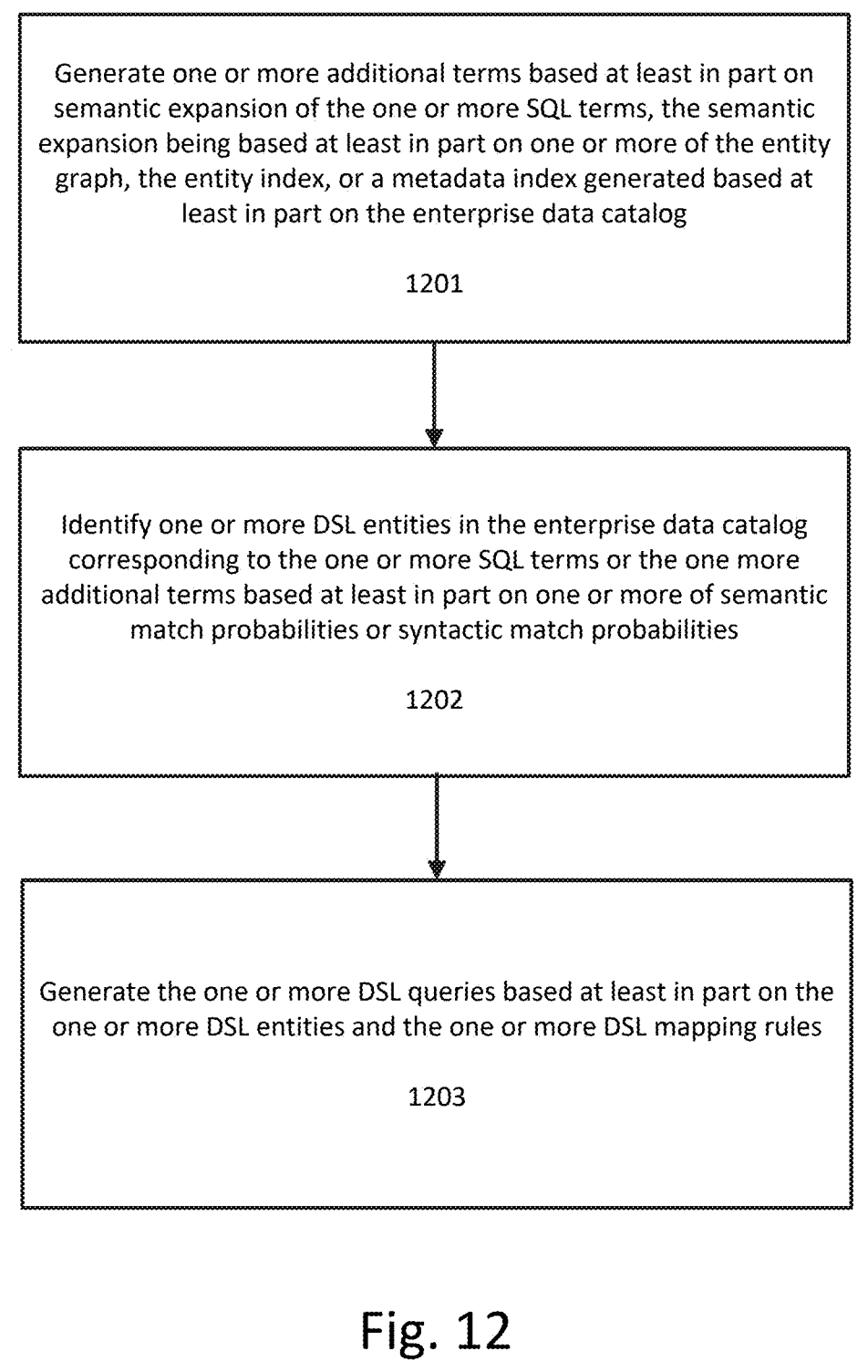

Generate one or more additional terms based at least in part on semantic expansion of the one or more SQL terms, the semantic expansion being based at least in part on one or more of the entity graph, the entity index, or a metadata index generated based at least in part on the enterprise data catalog

1201

Identify one or more DSL entities in the enterprise data catalog corresponding to the one or more SQL terms or the one more additional terms based at least in part on one or more of semantic match probabilities or syntactic match probabilities

1202

Generate the one or more DSL queries based at least in part on the one or more DSL entities and the one or more DSL mapping rules

Enterprise Data Catalog
1404

DSL Query
1403

NL to DSL Query
Conversion
1402

Results
1405

NL Query
1401

User Interface
1400

METHOD, APPARATUS, AND COMPUTER-READABLE MEDIUM FOR DOMAIN-SPECIFIC EXECUTION OF NATURAL LANGUAGE QUERIES

BACKGROUND

In data management, the ability to search for data assets within a data catalog is important, as users need to be able to retrieve assets stored in the data catalog. The most common search tools rely on a keyword-based search of a search index, execution of structured query language (SQL) query of a relational database, or a graph query of knowledge graph. However, each of these techniques suffers from drawbacks.

With keyword search, it can be difficult or impossible to express a user's specific intent, so search queries retrieve a result data set that is often much larger than the data requested by the user. Additionally, it can be difficult to narrow the search space given the limited set of filters that are available. For examples, users cannot express a negative semantic query such as "assets with a name that does not include the word 'customer.'"

Another form of search is via a structured query language, such as SQL, or via a graph query, such as Gremlin or SPARQL. Although graph queries appear similar to natural language queries, they are structured languages that conform to sets of grammar and lexical rules. While SQL queries and graph queries provide users with more power in expressing their search query and parameters, these query languages require specialized knowledge of both the query language syntax and rules and the structure of the data catalog itself.

Accordingly, improvements are needed in systems for domain-specific querying of data catalogs.

BRIEF DESCRIPTION OF THE DRAWINGS

FIG. 1 illustrates a flowchart for domain-specific execution of natural language queries according to an exemplary embodiment.

FIG. 6 illustrates a flowchart for querying the entity index based at least in part on the one or more nouns to identify one or more class entities corresponding to the one or more nouns and one or more class attributes corresponding to the one or more class entities according to an exemplary embodiment.

FIG. 8 illustrates another flowchart for querying the entity index based at least in part on the one or more nouns to identify one or more class entities corresponding to the one or more nouns and one or more class attributes corresponding to the one or more class entities according to an exemplary embodiment.

FIG. 12 illustrates a flowchart for transforming the one or more SQL queries into one or more domain specific language (DSL) queries based at least in part on the one or more SQL terms, one or more additional terms semantically related to the one or more SQL terms, and one or more DSL mapping rules configured to map SQL to DSL according to an exemplary embodiment.

DETAILED DESCRIPTION

While methods, systems, and computer-readable media are described herein by way of examples and embodiments, those skilled in the art recognize that methods, apparatuses, and computer-readable media for domain-specific execution of natural language queries are not limited to the embodiments or drawings described. The drawings and description are not intended to be limited to the particular form disclosed. Rather, the intention is to cover all modifications, equivalents and alternatives falling within the spirit and scope of the present disclosure and claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

Applicant has discovered a method, apparatus, and computer-readable medium (collectively "system") that enables users to search and discover assets in an enterprise catalog by using natural language to express their search query. The present system understands both the nuances in natural language and the semantic meaning captured in users' search queries. For example, if user enters a search query such as 'Get me policies on data protection' for which they do not explicitly use the policy name, the present system can retrieve a policy named GDPR (General Data Protection Regulation) from the catalog, as it understands that GDPR stands for general data protection regulation.

FIG. 1 illustrates a flowchart for domain-specific execution of natural language queries according to an exemplary embodiment. Each of the steps shown in FIG. 1 are performed by one or more computing devices of the system.

At step 101 a natural language query requesting data from an enterprise data catalog is received in a user interface. The natural language query includes a plurality of query terms. The natural language query can be any type of query that has an unstructured format and is not required to conform to any syntax or format rules.

Figure 2:
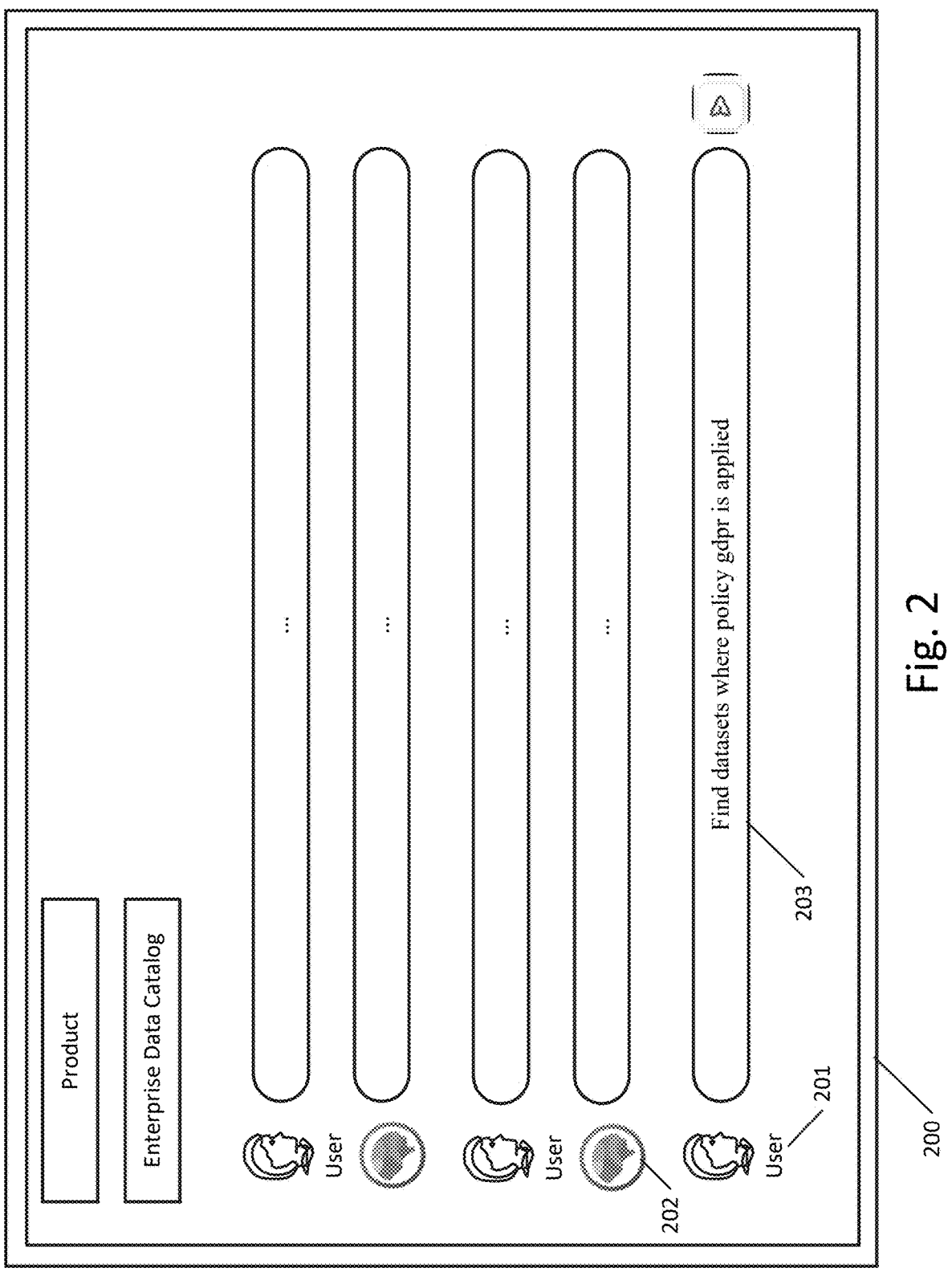
FIG. 2 illustrates an example of receiving a natural language query according to an exemplary embodiment.

FIG. 2 illustrates an example of receiving a natural language query according to an exemplary embodiment. User interface 200 can be a frontend interface of an enterprise data catalog and can be configured to receive natural language input from a user. For example, the user interface 200 can be an interface of a large language model (LLM) such as a generative pre-trained transformer (GPT). The LLM or GPT can be configured to interface with a backend enterprise data catalog, which itself can have a structured database format, such as a relational database, a graph database or other type of database.

As shown in FIG. 2, the interface 200 corresponds to product and/or an enterprise data catalog and allows for a back-and-forth dialog between the user 201 and the LLM/GPT 202. In the example shown in FIG. 2, the user 201 has entered the natural language query 203 "Find datasets where policy GDPR is applied."

Figure 3:
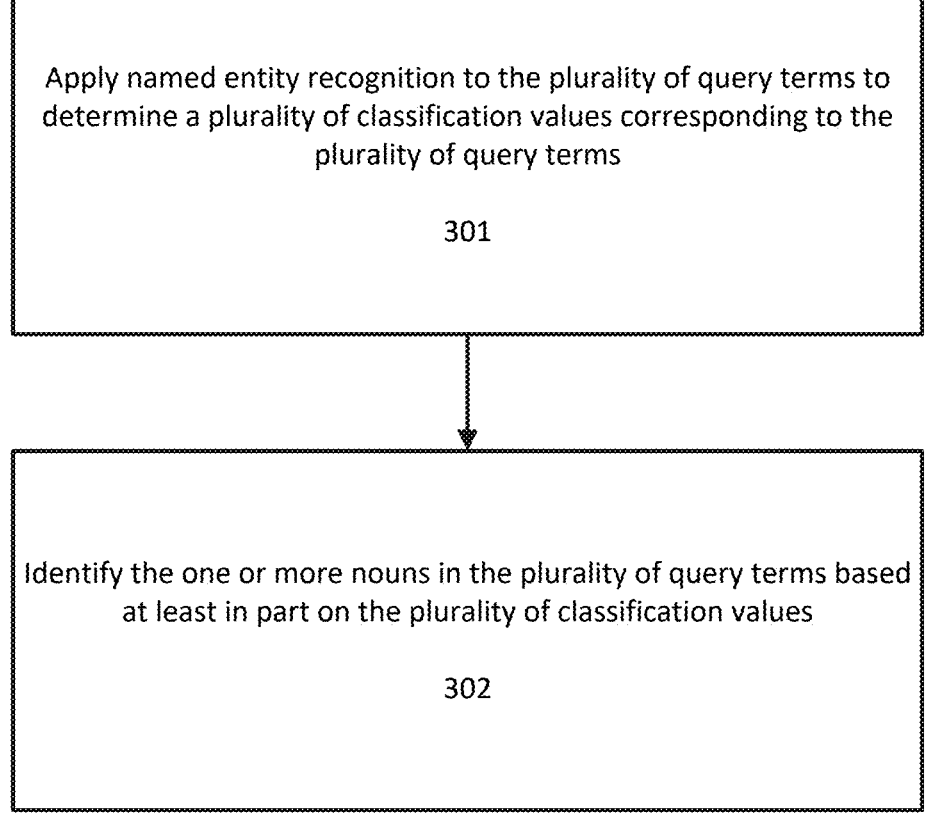
FIG. 3 illustrates a flowchart for identifying one or more nouns in the plurality of query terms according to an exemplary embodiment.

Returning to FIG. 1, at step 102 one or more nouns in the plurality of query terms are identified. FIG. 3 illustrates a flowchart for identifying one or more nouns in the plurality of query terms according to an exemplary embodiment.

At step 301 named entity recognition is applied to the plurality of query terms to determine a plurality of classification values corresponding to the plurality of query terms. At step 302 the one or more nouns in the plurality of query terms are identified based at least in part on the plurality of classification values. The named entity recognition (NER) process marks up or classifies query terms to identify parts-of-speech corresponding to each of the query term based on the word's definition and contextual clues (such as surrounding words). Of course, the identification of nouns can be performed using various different types of classifiers, and this example is not intended to be limiting.

Figure 4:
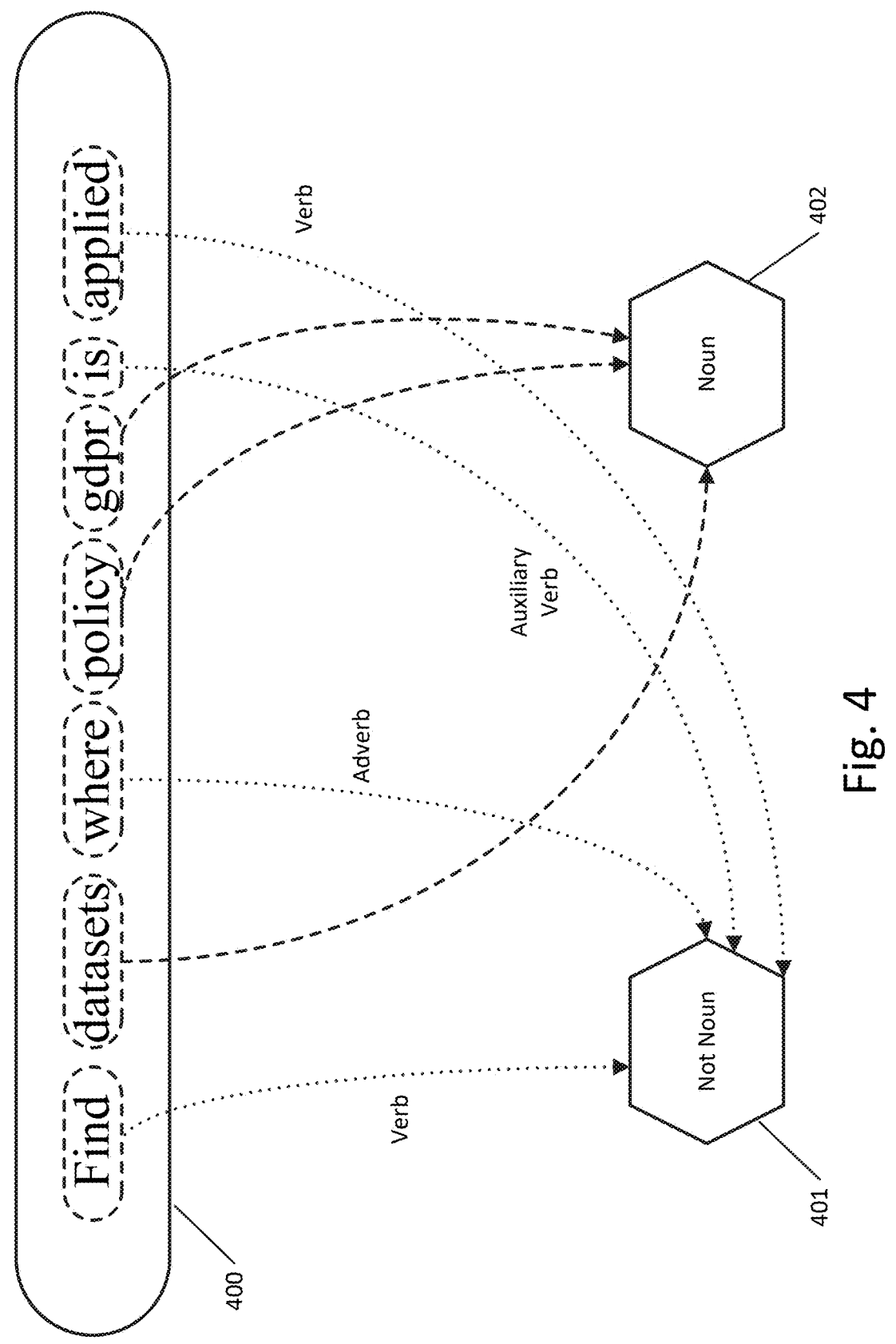
FIG. 4 illustrates an example of the named entity recognition process according to an exemplary embodiment.

FIG. 4 illustrates an example of the named entity recognition process according to an exemplary embodiment. As shown in FIG. 4, natural language query 400 includes a plurality of query terms. Each of these query terms are classified using named entity recognition to identify terms that are nouns 402 and terms that are not nouns 401. For example, the term "find" is identified as a verb and therefore classified as "not noun" 402. In this example, the terms "datasets," "policy," and "gdpr" are all classified as nouns 402.

Returning to FIG. 1, at step 103 an entity index is queried based at least in part on the one or more nouns to identify one or more class entities corresponding to the one or more nouns and one or more class attributes corresponding to the one or more class entities.

The entity index is generated based at least in part on an entity graph corresponding to the enterprise data catalog. The entity graph, also referred to a concept graph or knowledge graph, includes a plurality of nodes and a plurality of edges between the plurality of nodes. The plurality of nodes correspond to a plurality of concepts and the plurality of edges correspond to a plurality of relationships between the plurality of concepts.

Figure 5:
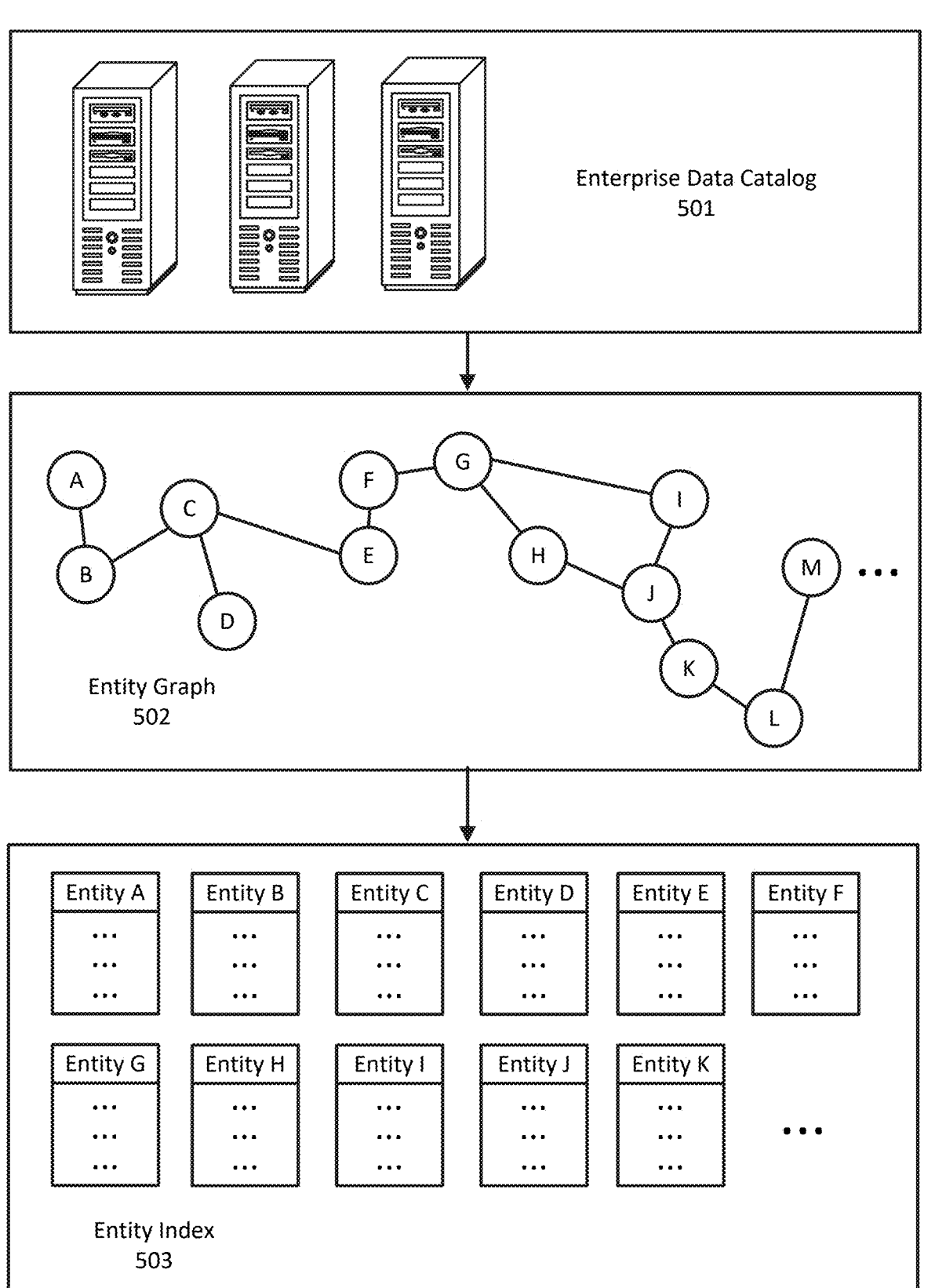
FIG. 5 illustrates the enterprise data catalog, entity graph, and entity index according to an exemplary embodiment.

FIG. 5 illustrates the enterprise data catalog, entity graph, and entity index according to an exemplary embodiment. The enterprise data catalog 501 is the backend database storing the enterprise data and can be organized in various ways, as discussed previously. For example, the enterprise data catalog can be a graph database or a relational database.

The entity graph 502 corresponds to the enterprise data catalog 501 and can be generated based at least in part on the enterprise data catalog. As discussed previously, each node in the entity graph corresponds to a concept, which can be any aspect of the enterprise data catalog. For example, each node can correspond to a data domain in the enterprise data catalog, a particular column in a table of the enterprise data catalog, a classification or attribute in the enterprise data catalog (e.g., business term), a particular data store, or any other conceptual entity in the enterprise data catalog. The entity graph can be pre-built from the enterprise data catalog prior to any query is received from a user.

The entity graph 502 also includes a plurality of edges between the plurality of nodes in the entity graph. The edges can be directed edges or undirected edges and indicate relationships between the concepts that correspond to the nodes. For example, an edge can connect a first node corresponding to a first table with a second node corresponding to another table, or to a third node corresponding to a column that is part of the first table, or to a fourth node corresponding to data domain that is part of the first table, or to any other node corresponding to any other conceptual entity that is related to the first table.

The entity index 503 is an index of the entities that are part of the entity graph and can store the entities that that are found in the entity graph, as well as attributes of those entities. For example, the entity graph 502 includes at least entities A-M and the entity index 503 stores data structures corresponding to each of these entities. The entity attributes can include the type of entity (e.g., class/domain, column, other concept), relationships (both the number of relationships and identification of related entities), and other features.

FIG. 6 illustrates a flowchart for querying the entity index based at least in part on the one or more nouns to identify one or more class entities corresponding to the one or more nouns and one or more class attributes corresponding to the one or more class entities according to an exemplary embodiment. At step 601 the entity index is queried with the one or more nouns to identify one or more class entities corresponding to the one or more nouns. Class entities are data domains or classes in the enterprise data catalog and this step identifies classes that are relevant to the nouns in the query. At step 602 the one or more class attributes corresponding to the one or more class entities in the entity index are identified.

Figure 7A:
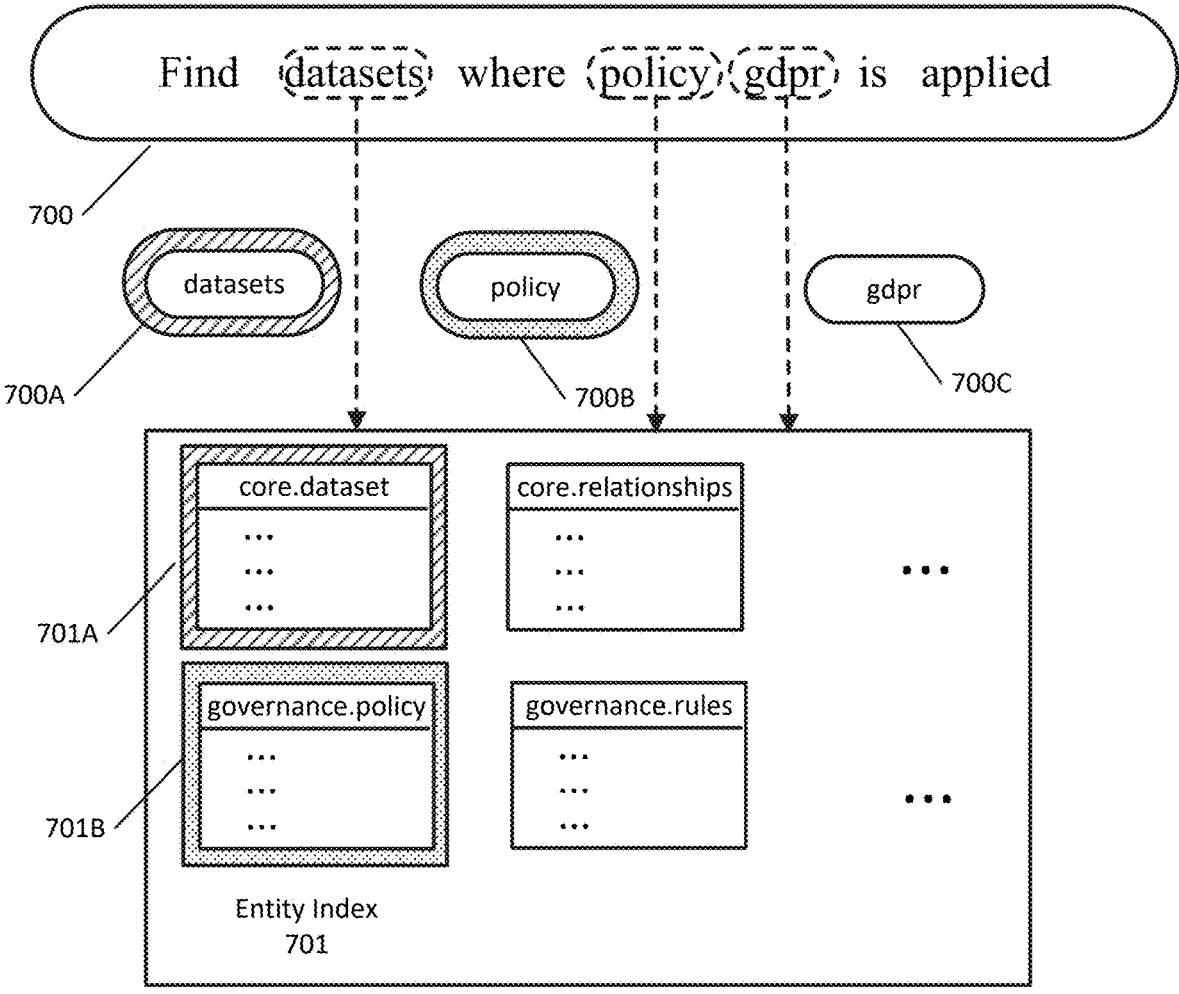
FIGS. 7A-7B illustrate an example of querying an entity index based at least in part on the one or more nouns to identify one or more class entities corresponding to the one or more nouns and one or more class attributes corresponding to the one or more class entities according to an exemplary embodiment.
Figure 7B:
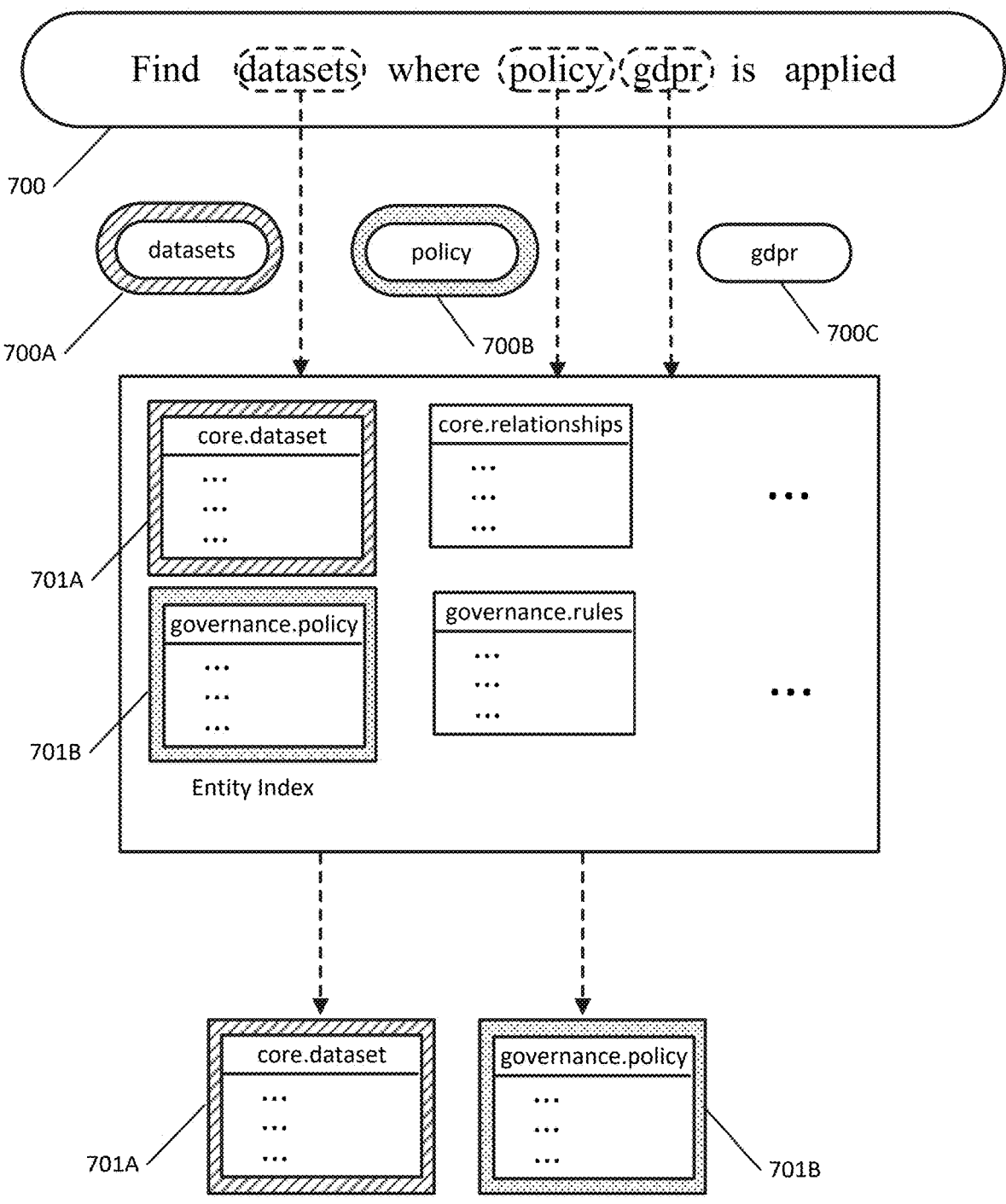

FIGS. 7A-7B illustrate an example of querying an entity index based at least in part on the one or more nouns to identify one or more class entities corresponding to the one or more nouns and one or more class attributes corresponding to the one or more class entities according to an exemplary embodiment.

As shown in FIG. 7A, a natural language query 700 is processed to identify nouns 700A, 700B, and 700C (using the techniques described previously). These noun terms are then used to query the entity index 701 to identify class entities corresponding to the noun terms. The matching process for identifying matching class entities can include string or substring matching, syntactic matching, and/or fuzzy matching logic, which can assign probabilities to classes that match the input query terms. In this case, class entity 701A corresponding to "core.dataset" is identified as potentially corresponding to the noun term "datasets" 700A and class entity 701B corresponding to "governance.policy"

is identified as potentially corresponding to the noun term "policy" 700B. Additionally, there is no matching class entity corresponding to the noun term "GDPR" 700C.

FIG. 7B illustrates the class entities and the class attributes corresponding to the class entities that are identified based on querying the entity index with the one or more nouns. As shown in FIG. 7B, the core.dataset 701A class entity and its corresponding attributes are identified as corresponding to noun "datasets" 700A and the governance.policy 701B class entity and its corresponding to attributes are identified as corresponding to noun "policy" 700B. Although the specific attributes are not shown in the figure, it is understood that the attributes can include details about these classes/data domains, such as component classes/columns, data types, primary and foreign keys, etc.

In some cases, the process of querying the entity index with a noun may result in more than one potential matching class entity. In these cases, the present system can leverage the relationship information stored in the entity graph and/or entity index to identify the matching class. In particular, the system can select between two more potentially matching class entities based at least in part on the relationships between each of those potentially matching class entities and other class entities that have been identified as corresponding to other nouns in the natural language query. This relationship information serves as a contextual cue that allows the system to more accurately identify any classes that correspond to the nouns in the query.

FIG. 8 illustrates another flowchart for querying the entity index based at least in part on the one or more nouns to identify one or more class entities corresponding to the one or more nouns and one or more class attributes corresponding to the one or more class entities according to an exemplary embodiment.

At step 801 the entity index is queried with a first noun in the plurality of nouns to identify a first class entity corresponding to the first noun. In this step there are no other matching class entities and the first class entity is identified as corresponding to the first noun.

At step 802 the entity index is queried with a second noun in the plurality of nouns to identify two or more second class entities. Each of these second class entities is a potential matching class entity for the second noun.

At step 803 a second class entity in the two or more second class entities is identified as corresponding to the second noun based at least in part on one or more relationships between the second class entity and the first class entity in the entity graph.

Figure 9A:
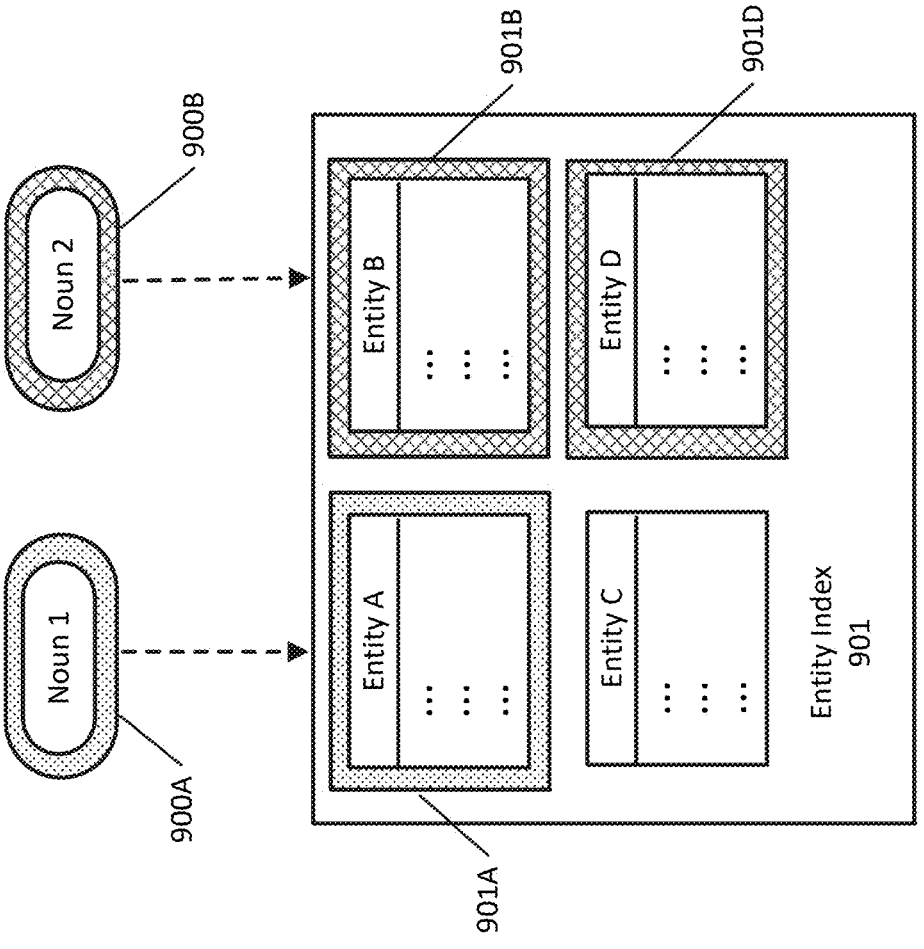
FIGS. 9A-9B illustrate another example of querying the entity index based at least in part on the one or more nouns to identify one or more class entities corresponding to the one or more nouns and one or more class attributes corresponding to the one or more class entities according to an exemplary embodiment.
Figure 9B:
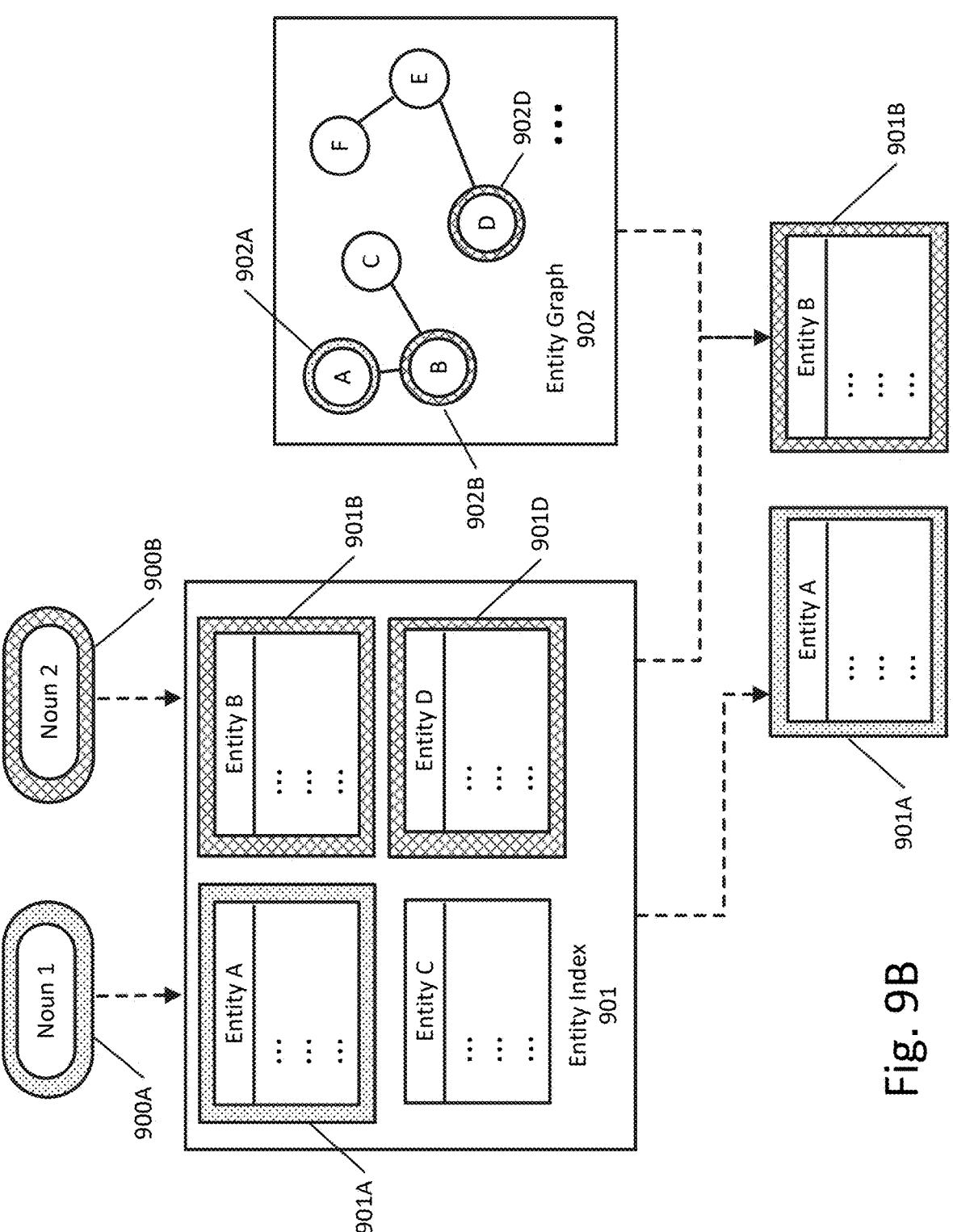

FIGS. 9A-9B illustrate another example of querying the entity index based at least in part on the one or more nouns to identify one or more class entities corresponding to the one or more nouns and one or more class attributes corresponding to the one or more class entities according to an exemplary embodiment.

The example shown in FIGS. 9A-9B illustrates how the relationships between entities in the entity graph are leveraged to identify matching entities for the noun terms in the query. As shown in FIG. 9A, Noun 1 900A and Noun 2 900B are used to query the entity index 901. The system identifies Entity A 901A as corresponding to Noun 1 900A. However, the system identifies both Entity B 901B and Entity D 901D as potentially corresponding to Noun 2 900B.

As shown in FIG. 9B, the entity graph 902 corresponding to the entity index 901 includes an edge between the entities corresponding to Entity A 902A and Entity B 902B. However, the entity graph 902 does not have an edge between Entity D 902D and Entity A 902A. Since Entity A 901A in the entity index 901 has already been selected as a matching class entity corresponding to Noun 1 900A, the system then chooses between Entity B 901B and Entity D 901D in the entity index 901 based on the relationships/edges with Entity A 902A in the entity graph 902. This results in the selection of Entity A 901A as corresponding to Noun 1 900A and Entity B 901B as corresponding to Noun 2 900B.

Returning to FIG. 1, at step 104 one or more structured query language (SQL) queries corresponding to the natural language query are generated based at least in part on providing the one or more class entities and the one or more class attributes as context to a large language model (LLM), the one or more SQL queries comprising one or more SQL terms.

Figure 10:
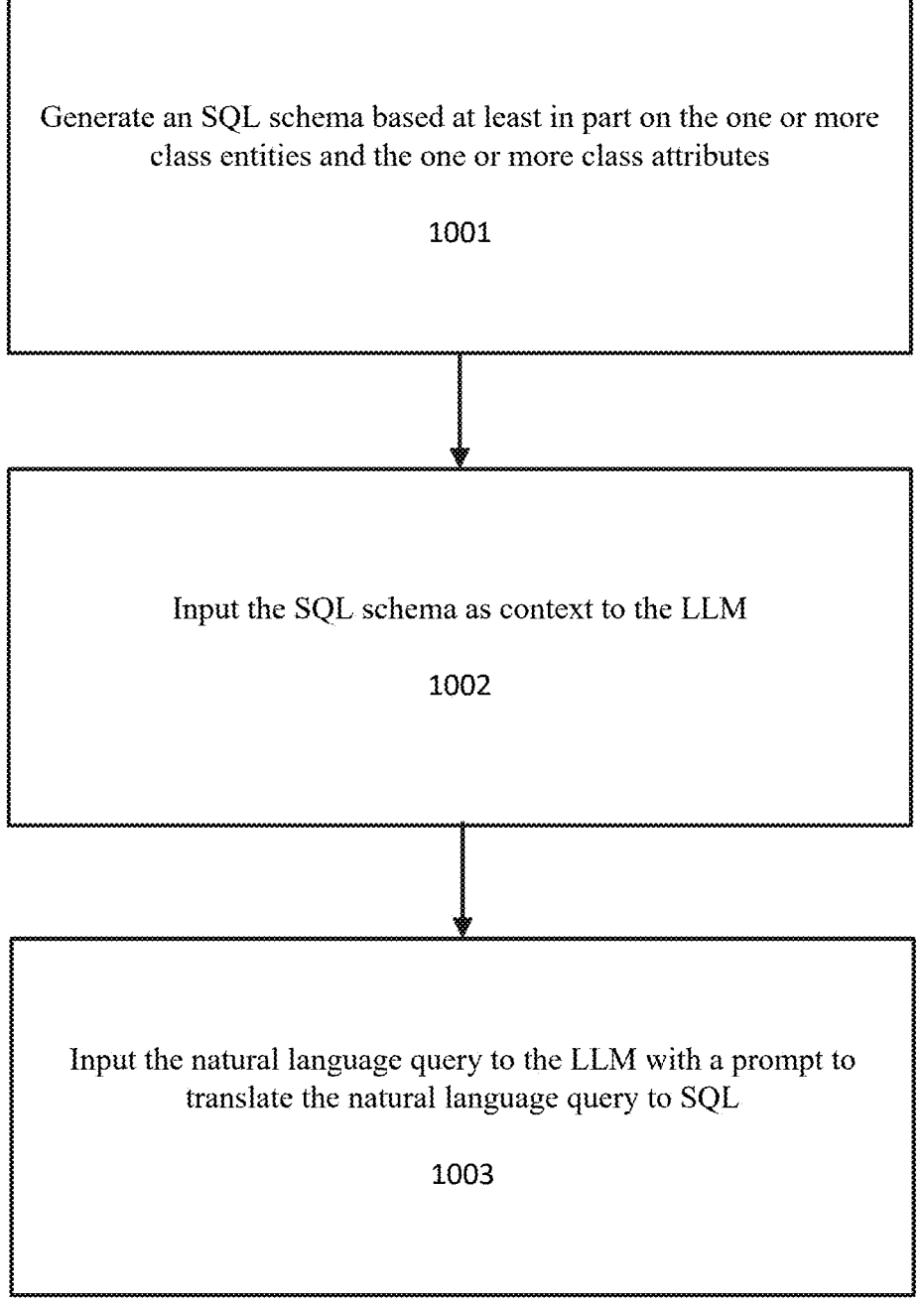
FIG. 10 illustrates a flowchart for generating for one or more structured query language (SQL) queries corresponding to the natural language query based at least in part on providing the one or more class entities and the one or more class attributes as context to a large language model (LLM) according to an exemplary embodiment.

FIG. 10 illustrates a flowchart for generating for one or more structured query language (SQL) queries corresponding to the natural language query based at least in part on providing the one or more class entities and the one or more class attributes as context to a large language model (LLM) according to an exemplary embodiment.

At step 1001 an SQL schema is generated based at least in part on the one or more class entities and the one or more class attributes. The SQL schema can be a reduced schema corresponding only to the class entities that are relevant to the nouns in the natural language query, rather than a full schema of all related entities or attributes.

At step 1002 the SQL schema is input as context to the LLM. This step provides the LLM with the required context to understand the data domains/classes that are pertinent to the natural language query.

At step 1003 the natural language query is input to the LLM with a prompt to translate the natural language query to SQL. The LLM can be a model that is fine tuned to convert natural language queries into SQL. The prior step of providing the SQL schema as context, along with the training of model, allows the LLM to accurately generate a SQL query based on the input natural language query.

Figure 11A:
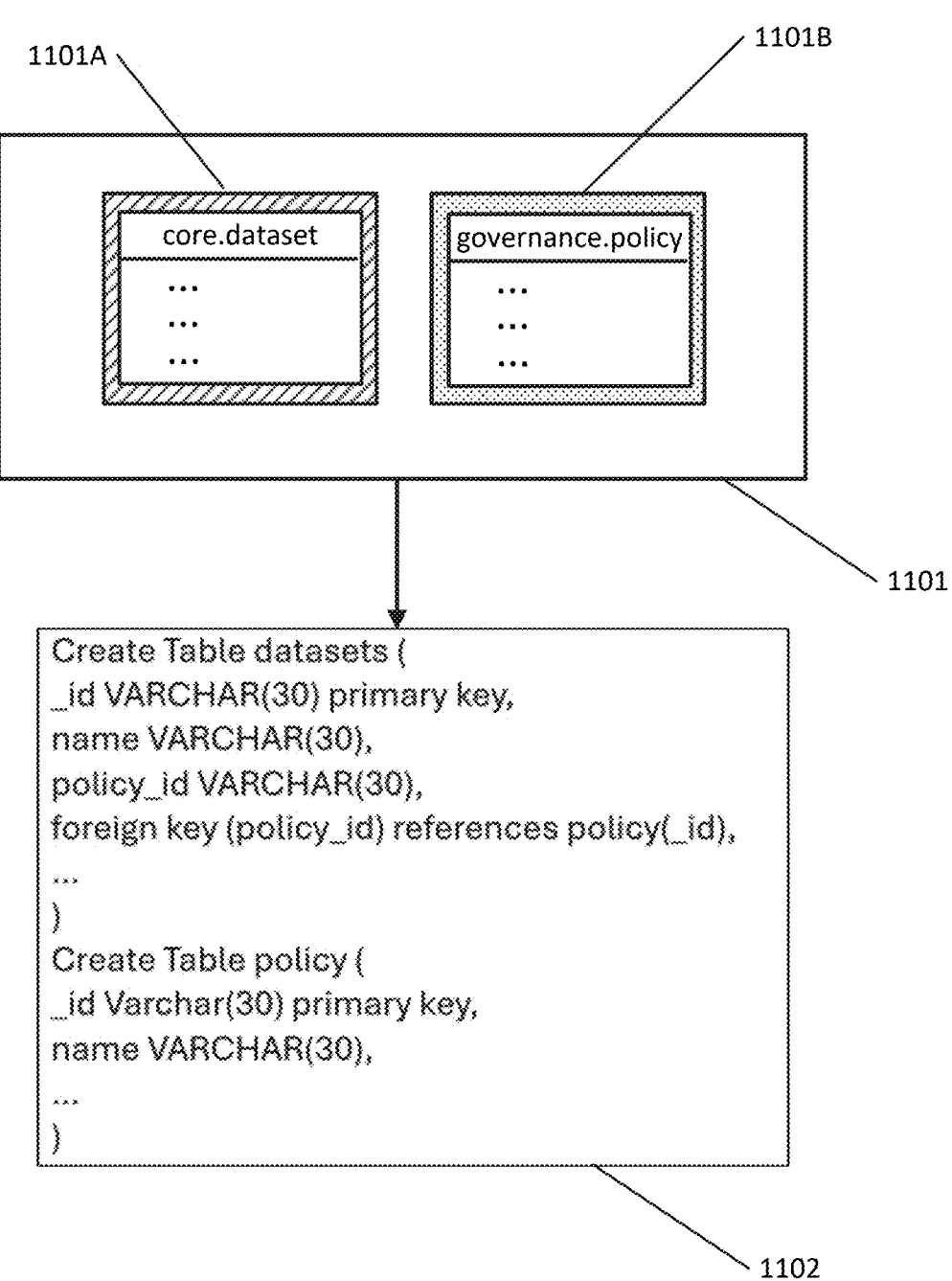
FIGS. 11A-11B illustrate an example of generating SQL queries corresponding to the natural language query according to an exemplary embodiment.
Figure 11B:
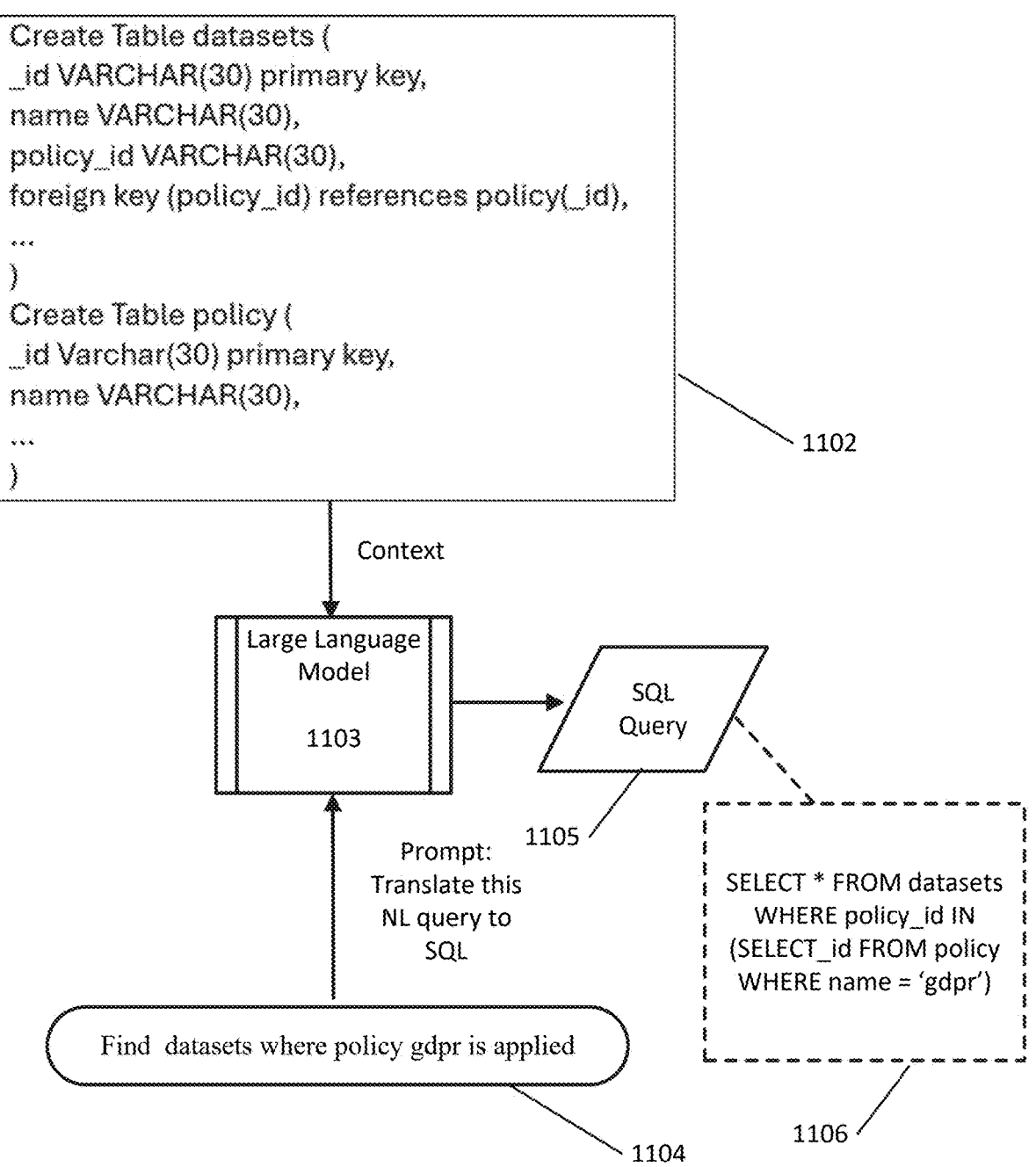

FIGS. 11A-11B illustrate an example of generating SQL queries corresponding to the natural language query according to an exemplary embodiment. As shown in FIG. 11A, the previously identified class entities and attributes 1101, including class entity 1101A and its attributes and class entity 1101B and its attributes, are used to generate an SQL schema or reduced SQL schema 1102. The SQL schema 1102 can include definitions for tables corresponding to the identified class entities and the specific data structures and parameters of each of the tables can be derived based at least in part on the attributes of the class entities.

As shown FIG. 11B, the SQL schema 1102 is provided as contextual information to an LLM 1103. As discussed previously, the SQL schema 1102 is a reduced schema that aids the LLM 1103 with the translation of the natural language query into an SQL query. This schema is referred to as a reduced schema because a full schema of enterprise data catalog would include all classes and attributes from the catalog, which would result in a substantial number of inputs to the LLM and could exceed a token limit imposed by the LLM. One of the advantages of the present system is that relationships and entities in the entity index and entity graph are leveraged to represent the catalog in a concise manner that is relevant to the natural language query that is being asked.

The natural language query 1104 is also provided to the large language model 1103, along with a prompt to translate the natural language query to structured query language. The large language model 1103 takes in the context 1102, the prompt, and the natural language query 1104 and produces a corresponding SQL query 1105. In this example, the SQL query generated by the LLM 1103 is shown in box 1106.

Returning to FIG. 1, at step 105 the one or more SQL queries are transformed into one or more domain specific language (DSL) queries based at least in part on the one or more SQL terms, one or more additional terms semantically related to the one or more SQL terms, and one or more DSL mapping rules configured to map SQL to DSL.

FIG. 12 illustrates a flowchart for transforming the one or more SQL queries into one or more domain specific language (DSL) queries based at least in part on the one or more SQL terms, one or more additional terms semantically related to the one or more SQL terms, and one or more DSL mapping rules configured to map SQL to DSL according to an exemplary embodiment.

At step 1201 the one or more additional terms are generated based at least in part on semantic expansion of the one or more SQL terms, the semantic expansion being based at least in part on one or more of the entity graph, the entity index, or a metadata index generated based at least in part on the enterprise data catalog.

Step 1201 can include generating at least one additional term that is semantically related to at least one SQL term based at least in part on the metadata index. Step 1201 can additionally or alternatively include generating at least one additional term that is semantically related to at least one SQL term based at least in part on relationships in the entity graph.

The metadata index stores metadata corresponding to entities in the entity graph and/or entity index. For example, the metadata index can include descriptive metadata about a particular column in a table. If the entity is a "customer" column, then the metadata index can include other words for customer, such as "client," "user," etc. The metadata index can be a vector index and can be specific to different tenants or clients (i.e., if the enterprise data catalog is provided as a service, the metadata index, the entity index, and entity graph can be unique to each client/subscriber). The metadata index can be generated based on the name and description fields of each asset/concept.

The step of identifying additional terms that are semantically related can include different types of semantic expansion.

Self-match interpretation: In this type of expansion, the system can identify all data elements whose names or descriptions match an existing term (e.g., "customer") in the SQL query or are semantically similar to the existing term.

Relationship expansion interpretation: In this type of expansion, the system can identify data elements that belong to a data set whose name/description matches an existing term in the SQL query or are semantically like the existing term (i.e., a hierarchy search). Additionally, the system can also identify data elements that are derived from another asset whose name/description matches the existing term or semantically similar to the existing term (i.e., a lineage or data flow search). Furthermore, the system can identify data elements that are in the neighborhood of some other assets whose name/description matches the existing term or is semantically similar to the existing term (i.e., a neighborhood search).

The additional terms can be identified based on semantic similarity, semantic match probabilities, fuzzy logic, or any other technique for identifying semantically similar terms to the existing terms in the SQL query.

At step 1202 one or more DSL entities in the enterprise data catalog corresponding to the one or more SQL terms or the one more additional terms are identified based at least in part on one or more of semantic match probabilities or syntactic match probabilities. The DSL entities can be identified based on the SQL terms in the SQL query and/or the identified additional terms.

At step 1203 the one or more DSL queries are generated based at least in part on the one or more DSL entities and the one or more DSL mapping rules. This step converts the translated SQL query into a DSL query using an SQL parser, and the one or more DSL mapping rules. The SQL parser converts the SQL query to a SQL tree, and the one or more DSL mapping rules convert various SQL clauses (SELECT, FROM, WHERE etc.) to appropriate predicates that the DSL supports. Depending on the choice of DSL, these rules can be quite different.

Figure 13:
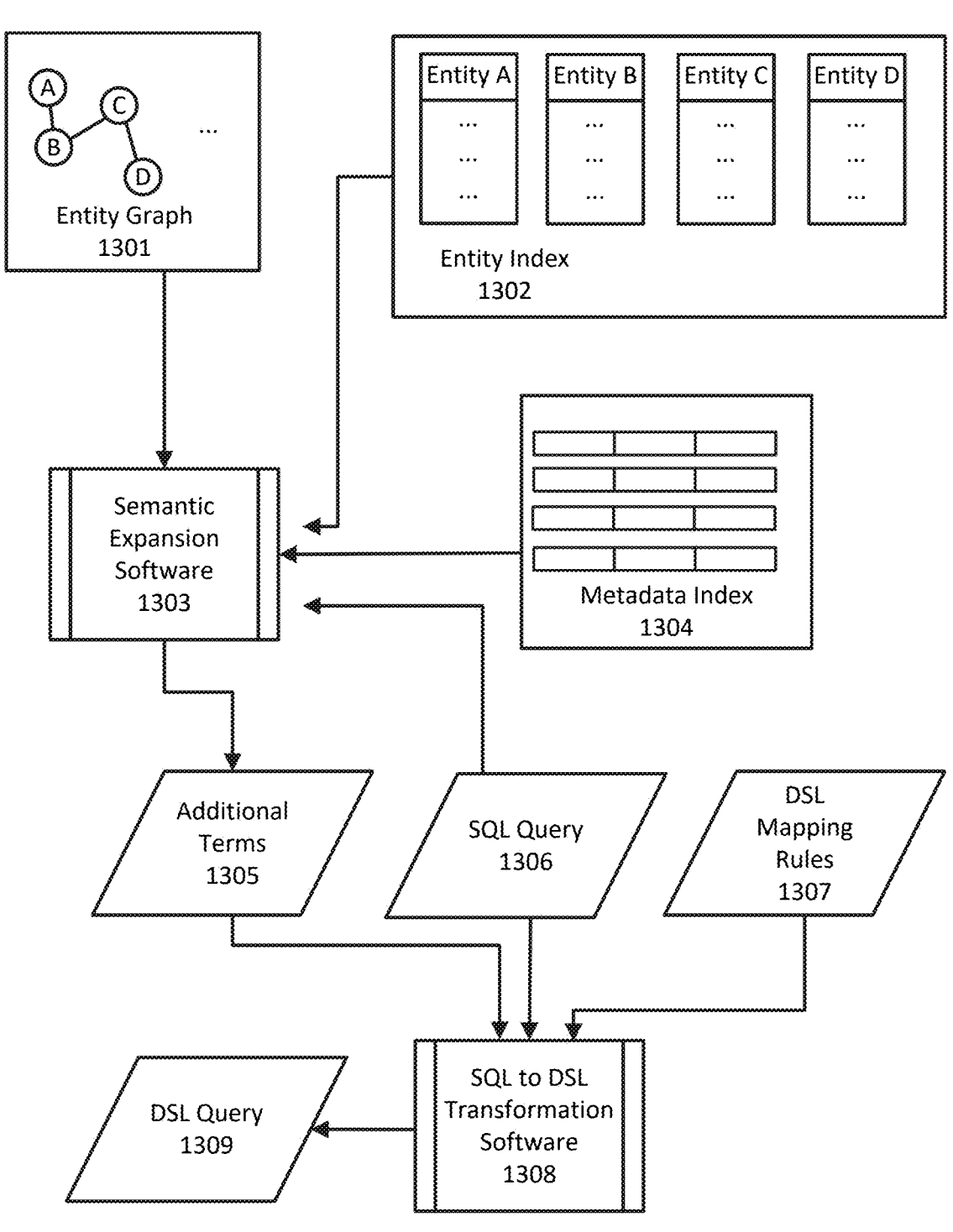
FIG. 13 illustrates a system process flow diagram for generating a DSL query according to an exemplary embodiment.

FIG. 13 illustrates a system process flow diagram for generating a DSL query according to an exemplary embodiment. As shown in FIG. 13, the entity graph 1301, the entity index 1302, the metadata index 1304, and the SQL query 1306 are provided to semantic expansion software 1303, which generates additional terms 1305. Additional terms 1305, the SQL query 1306, and the DSL mapping rules 1307 are then provided to SQL to DSL transformation software, which generates the DSL query 1309, as discussed above.

Returning to FIG. 1, at step 106 the DSL query is executed on the enterprise data catalog to identify one or more results corresponding to the natural language query. Additionally, at step 107 the one or more results are transmitted in the user interface.

Figure 14:
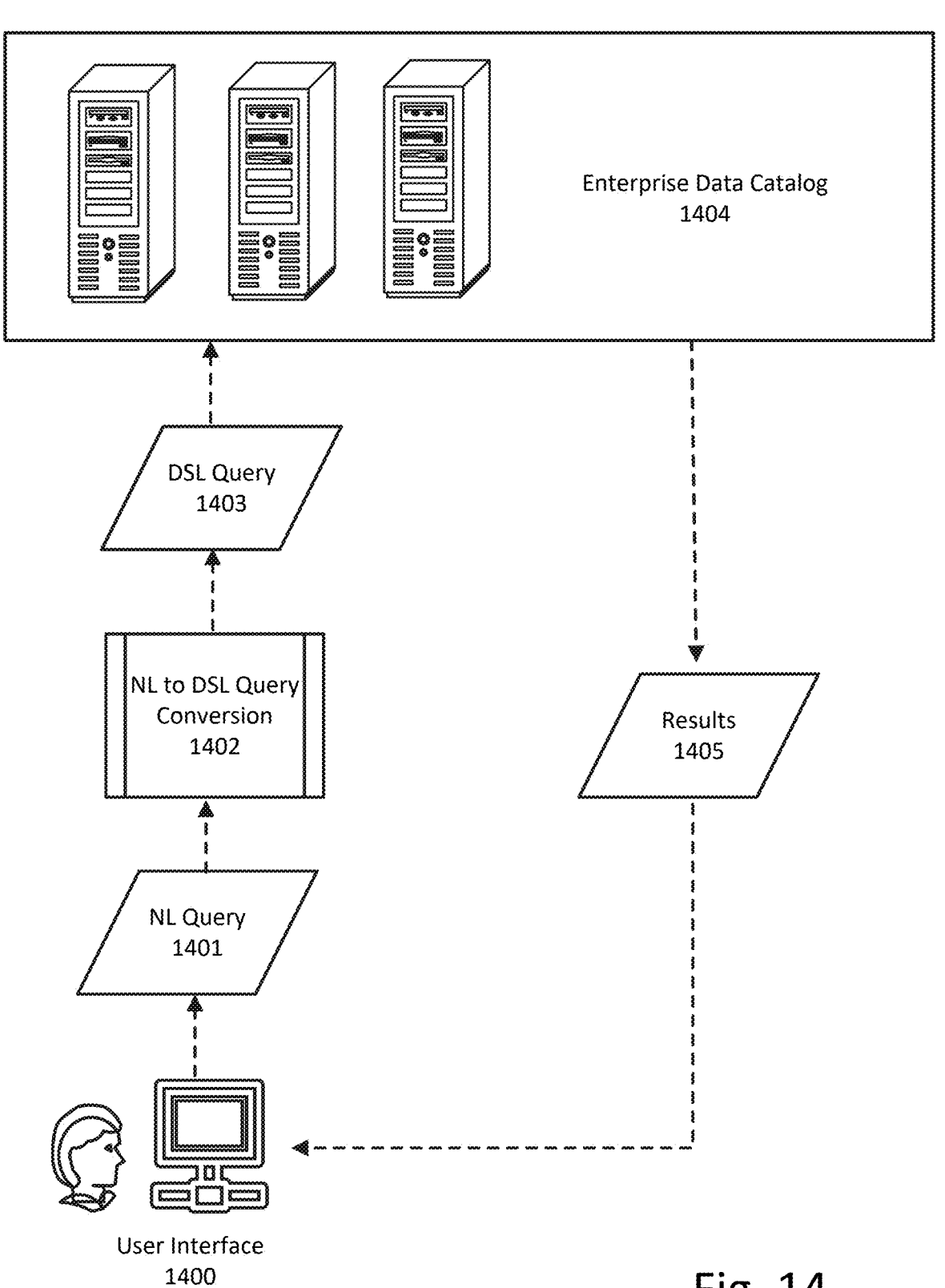
FIG. 14 illustrates a system process flow diagram for the overall process described herein according to an exemplary embodiment.

FIG. 14 illustrates a system process flow diagram for the overall process described herein according to an exemplary embodiment. As shown in FIG. 14, a user enters a natural language query 1401 into a user interface 1400. The NL query 1401 is then converted into a DSL query 1403 using the NL to DSL query conversion process 1402, which is described herein. The DSL query 1403 is then executed on the enterprise data catalog 1404 to return results 1405, which are then passed back to the user interface 1400. Optionally, when the user interface includes a GPT or similar interface, the results can be returned in the chat interface to the user.

Figure 15:
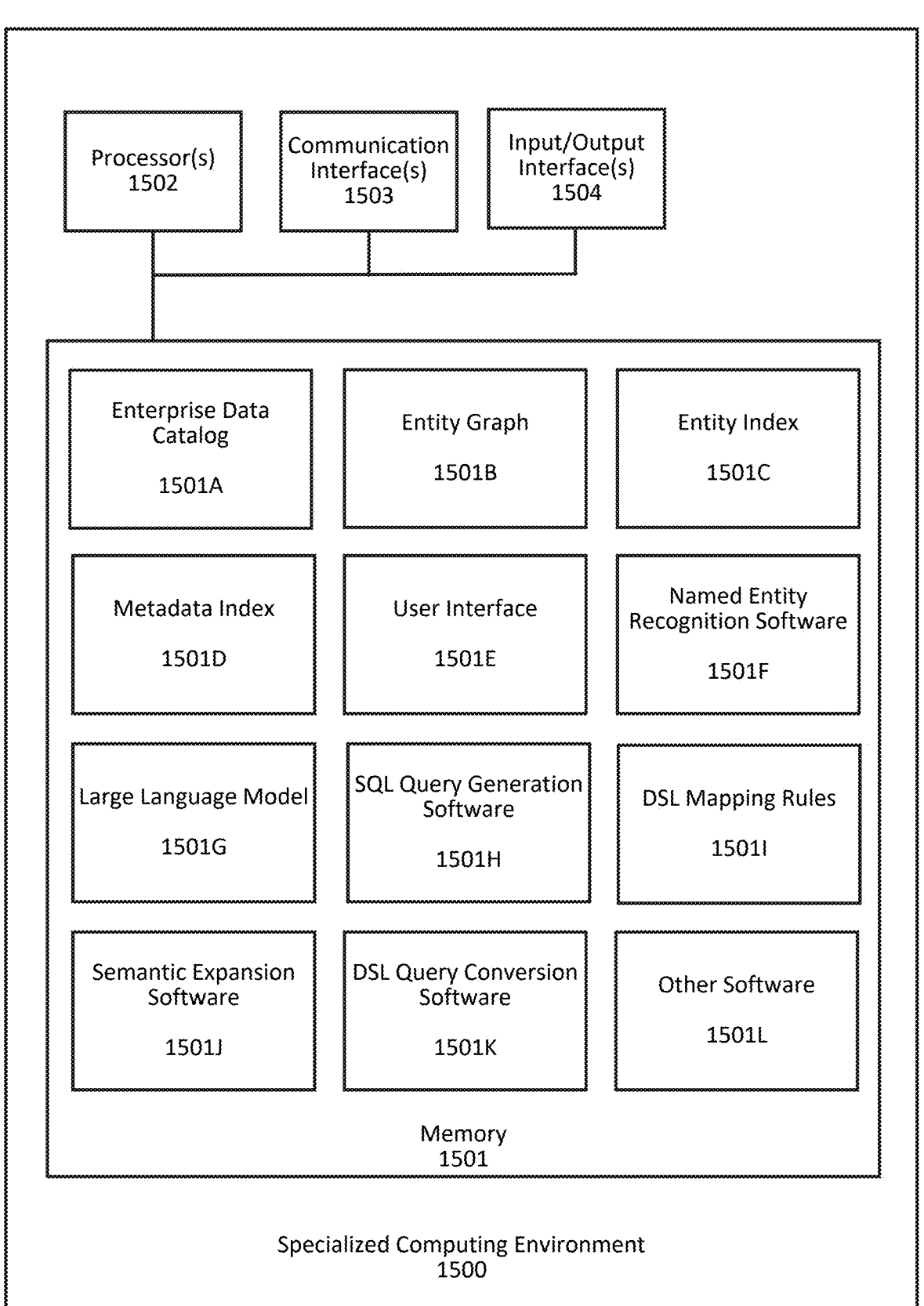
FIG. 15 illustrates a specialized computing environment configured to perform the described methods and implement the described systems according to an exemplary embodiment.

One or more of the above-described techniques can be implemented in or involve one or more special-purpose computer systems having computer-readable instructions loaded thereon that enable the computer system to implement the above-described techniques. FIG. 15 illustrates a specialized computing environment 1500 that is used to perform the above-described methods and implement the above-described systems according to an exemplary embodiment.

With reference to FIG. 15, the computing environment 1500 includes at least one processing unit/controller 1502 and memory 1501. The processing unit 1502 executes computer-executable instructions. In a multi-processing system, multiple processing units execute computer-executable instructions to increase processing power. The memory 1501 can be volatile memory (e.g., registers, cache, RAM), non-volatile memory (e.g., ROM, EEPROM, flash memory, etc.), or some combination of the two. The memory 1501 can store software implementing the above-described techniques and data structures, including enterprise data catalog 1501A, entity graph 1501B, entity index 1501C, metadata index 1501D, user interface 1501E, named entity recognition software 1501F, large language model 1501G, SQL generation software 1501H, DSL mapping rules 1501I, semantic expansion software 1501J, DSL Query Conversion Software 1501K, or other software 1501L corresponding to the processes described herein.

All of the software stored within memory 1501 can be stored as a computer-readable instructions, that when executed by one or more processors 1502, cause the processors to perform the functionality described with respect to FIGS. 1-15.

Processor(s) 1502 execute computer-executable instructions. In a multi-processing system, multiple processors or multicore processors can be used to execute computer-executable instructions to increase processing power and/or to execute certain software in parallel.

Specialized computing environment 1500 additionally includes a communication interface 1503, such as a network interface, which is used to communicate with devices, applications, or processes on a computer network or computing system, collect data from devices on a network, such as legacy systems, destination systems, or other network systems, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 1500 further includes input and output interfaces 1504 that allow users (such as system administrators) to provide input to the system to set parameters, to edit data stored in memory 1501, or to perform other administrative functions.

An interconnection mechanism (shown as a solid line in FIG. 15), such as a bus, controller, or network interconnects the components of the specialized computing environment 1500.

Input and output interfaces 1504 can be coupled to input and output devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 1500.

Specialized computing environment 1500 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 1500.

The present systems allows user to interface with enterprise data catalog and discover relevant enterprise data using natural language. The system includes a schema extractor/reducer, discussed previously, which assembles a context that is utilized by an LLM to convert a natural language query to a SQL query. The system further includes a SQL to DSL converter that converts the SQL query to a domain specific language (DSL) query, which can then be executed to retrieve answers for the user's natural language query.

As discussed previously, the schema reducer/extractor utilizes an entity index and entity graph of catalog concepts, attributes, and relationships between concepts. The entity index also includes synthetic attributes created to aid in the natural language to SQL translation process and techniques to map concepts identified by named entity recognition to catalog concepts and identify relevant relationships.

The SQL to DSL conversion process transforms the SQL query to a list of DSL queries. This transformer uses a metadata index, which can be customized to different customers, users or enterprises using their own metadata. This index is used to discover catalog assets whose names or description are semantically related to those searched by users provided in NL query. The transformer also generates a list of structured queries that represents various interpretations of user query via relationship expansion including hierarchy search, lineage search and neighborhood search provided that the catalog concepts are organized as a graph.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

We claim:

1. A method executed by one or more computing devices for domain-specific execution of natural language queries, the method comprising:

receiving, by at least one of the one or more computing devices, a natural language query in a user interface, the natural language query comprising a plurality of query terms and requesting data from an enterprise data catalog;

identifying, by at least one of the one or more computing devices, one or more nouns in the plurality of query terms;

querying, by at least one of the one or more computing devices, an entity index based at least in part on the one or more nouns to identify one or more class entities corresponding to the one or more nouns and one or more class attributes corresponding to the one or more class entities, the entity index being generated based at least in part on an entity graph corresponding to the enterprise data catalog, the entity graph comprising a plurality of nodes and a plurality of edges between the plurality of nodes, wherein the plurality of nodes correspond to a plurality of concepts and the plurality of edges correspond to a plurality of relationships between the plurality of concepts;

generating, by at least one of the one or more computing devices, one or more structured query language (SQL) queries corresponding to the natural language query based at least in part on providing the one or more class entities and the one or more class attributes as context to a large language model (LLM), the one or more SQL queries comprising one or more SQL terms;

transforming, by at least one of the one or more computing devices, the one or more SQL queries into one or more domain specific language (DSL) queries based at least in part on the one or more SQL terms, one or more additional terms semantically related to the one or more SQL terms, and one or more DSL mapping rules configured to map SQL to DSL;

executing, by at least one of the one or more computing devices, the DSL query on the enterprise data catalog to identify one or more results corresponding to the natural language query; and transmitting, by at least one of the one or more computing devices, the one or more results in the user interface.

2. The method of claim 1, wherein identifying one or more nouns in the plurality of query terms comprises:

applying named entity recognition to the plurality of query terms to determine a plurality of classification values corresponding to the plurality of query terms;

identifying the one or more nouns in the plurality of query terms based at least in part on the plurality of classification values.

3. The method of claim 1, wherein querying an entity index based at least in part on the one or more nouns to identify one or more class entities corresponding to the one or more nouns and one or more class attributes corresponding to the one or more class entities comprises:

querying the entity index with the one or more nouns to identify one or more class entities corresponding to the one or more nouns; and identifying the one or more class attributes corresponding to the one or more class entities in the entity index.

4. The method of claim 3, wherein the one or more nouns comprises a plurality of nouns and wherein querying the entity index with the one or more nouns to identify one or more class entities corresponding to the one or more nouns comprises:

querying the entity index with a first noun in the plurality of nouns to identify a first class entity corresponding to the first noun;

querying the entity index with a second noun in the plurality of nouns to identify two or more second class entities;

identifying a second class entity in the two or more second class entities as corresponding to the second noun based at least in part on one or more relationships between the second class entity and the first class entity in the entity graph.

5. The method of claim 1, wherein generating one or more structured query language (SQL) queries corresponding to the natural language query based at least in part on providing the one or more class entities and the one or more class attributes as context to a large language model (LLM) comprises:

generating an SQL schema based at least in part on the one or more class entities and the one or more class attributes;

inputting the SQL schema as context to the LLM; and inputting the natural language query to the LLM with a prompt to translate the natural language query to SQL.

6. The method of claim 1, wherein transforming the one or more SQL queries into one or more domain specific language (DSL) queries based at least in part on the one or more SQL terms, one or more additional terms semantically related to the one or more SQL terms, and one or more DSL mapping rules configured to map SQL to DSL comprises:

generating the one or more additional terms based at least in part on semantic expansion of the one or more SQL terms, the semantic expansion being based at least in part on one or more of the entity graph, the entity index, or a metadata index generated based at least in part on the enterprise data catalog;

identifying one or more DSL entities in the enterprise data catalog corresponding to the one or more SQL terms or the one more additional terms based at least in part on one or more of semantic match probabilities or syntactic match probabilities; and generating the one or more DSL queries based at least in part on the one or more DSL entities and the one or more DSL mapping rules.

7. The method of claim 6, wherein generating the one or more additional terms based at least in part on semantic expansion of the one or more SQL terms comprises one or more of:

generating at least one additional term that is semantically related to at least one SQL term based at least in part on the metadata index; or generating at least one additional term that is semantically related to at least one SQL term based at least in part on relationships in the entity graph.

8. An apparatus for domain-specific execution of natural language queries, the apparatus comprising:

one or more processors; and one or more memories operatively coupled to at least one of the one or more processors and having instructions stored thereon that, when executed by at least one of the one or more processors, cause at least one of the one or more processors to:

receive a natural language query in a user interface, the natural language query comprising a plurality of query terms and requesting data from an enterprise data catalog;

identify one or more nouns in the plurality of query terms;

query an entity index based at least in part on the one or more nouns to identify one or more class entities corresponding to the one or more nouns and one or more class attributes corresponding to the one or more class entities, the entity index being generated based at least in part on an entity graph corresponding to the enterprise data catalog, the entity graph comprising a plurality of nodes and a plurality of edges between the plurality of nodes, wherein the plurality of nodes correspond to a plurality of concepts and the plurality of edges correspond to a plurality of relationships between the plurality of concepts;

generate one or more structured query language (SQL) queries corresponding to the natural language query based at least in part on providing the one or more class entities and the one or more class attributes as context to a large language model (LLM), the one or more SQL queries comprising one or more SQL terms;

transform the one or more SQL queries into one or more domain specific language (DSL) queries based at least in part on the one or more SQL terms, one or more additional terms semantically related to the one or more SQL terms, and one or more DSL mapping rules configured to map SQL to DSL;

execute the DSL query on the enterprise data catalog to identify one or more results corresponding to the natural language query; and transmit the one or more results in the user interface.

9. The apparatus of claim 8, wherein the instructions that, when executed by at least one of the one or more processors, cause at least one of the one or more processors to identify one or more nouns in the plurality of query terms further cause at least one of the one or more processors to:

applying named entity recognition to the plurality of query terms to determine a plurality of classification values corresponding to the plurality of query terms;

identifying the one or more nouns in the plurality of query terms based at least in part on the plurality of classification values.

10. The apparatus of claim 8, wherein the instructions that, when executed by at least one of the one or more processors, cause at least one of the one or more processors to query an entity index based at least in part on the one or more nouns to identify one or more class entities corresponding to the one or more nouns and one or more class attributes corresponding to the one or more class entities further cause at least one of the one or more processors to:

querying the entity index with the one or more nouns to identify one or more class entities corresponding to the one or more nouns; and identifying the one or more class attributes corresponding to the one or more class entities in the entity index.

11. The apparatus of claim 10, wherein the one or more nouns comprises a plurality of nouns and wherein the instructions that, when executed by at least one of the one or more processors, cause at least one of the one or more processors to query the entity index with the one or more nouns to identify one or more class entities corresponding to the one or more nouns further cause at least one of the one or more processors to:

querying the entity index with a first noun in the plurality of nouns to identify a first class entity corresponding to the first noun;

querying the entity index with a second noun in the plurality of nouns to identify two or more second class entities;

identifying a second class entity in the two or more second class entities as corresponding to the second noun based at least in part on one or more relationships between the second class entity and the first class entity in the entity graph.

12. The apparatus of claim 8, wherein the instructions that, when executed by at least one of the one or more processors, cause at least one of the one or more processors to generate one or more structured query language (SQL) queries corresponding to the natural language query based at least in part on providing the one or more class entities and the one or more class attributes as context to a large language model (LLM) further cause at least one of the one or more processors to:

generating an SQL schema based at least in part on the one or more class entities and the one or more class attributes;

inputting the SQL schema as context to the LLM; and inputting the natural language query to the LLM with a prompt to translate the natural language query to SQL.

13. The apparatus of claim 8, wherein the instructions that, when executed by at least one of the one or more processors, cause at least one of the one or more processors to transform the one or more SQL queries into one or more domain specific language (DSL) queries based at least in part on the one or more SQL terms, one or more additional terms semantically related to the one or more SQL terms, and one or more DSL mapping rules configured to map SQL to DSL further cause at least one of the one or more processors to:

generating the one or more additional terms based at least in part on semantic expansion of the one or more SQL terms, the semantic expansion being based at least in part on one or more of the entity graph, the entity index, or a metadata index generated based at least in part on the enterprise data catalog;

identifying one or more DSL entities in the enterprise data catalog corresponding to the one or more SQL terms or the one more additional terms based at least in part on one or more of semantic match probabilities or syntactic match probabilities; and generating the one or more DSL queries based at least in part on the one or more DSL entities and the one or more DSL mapping rules.

14. The apparatus of claim 13, wherein the instructions that, when executed by at least one of the one or more processors, cause at least one of the one or more processors to generate the one or more additional terms based at least in part on semantic expansion of the one or more SQL terms further cause at least one of the one or more processors to perform one or more of:

generate at least one additional term that is semantically related to at least one SQL term based at least in part on the metadata index; or generate at least one additional term that is semantically related to at least one SQL term based at least in part on relationships in the entity graph.

15. At least one non-transitory computer-readable medium storing computer-readable instructions for domain-specific execution of natural language queries that, when executed by one or more computing devices, cause at least one of the one or more computing devices to:

receive a natural language query in a user interface, the natural language query comprising a plurality of query terms and requesting data from an enterprise data catalog;

identify one or more nouns in the plurality of query terms;

query an entity index based at least in part on the one or more nouns to identify one or more class entities corresponding to the one or more nouns and one or more class attributes corresponding to the one or more class entities, the entity index being generated based at least in part on an entity graph corresponding to the enterprise data catalog, the entity graph comprising a plurality of nodes and a plurality of edges between the plurality of nodes, wherein the plurality of nodes correspond to a plurality of concepts and the plurality of edges correspond to a plurality of relationships between the plurality of concepts;

generate one or more structured query language (SQL) queries corresponding to the natural language query based at least in part on providing the one or more class entities and the one or more class attributes as context to a large language model (LLM), the one or more SQL queries comprising one or more SQL terms;

transform the one or more SQL queries into one or more domain specific language (DSL) queries based at least in part on the one or more SQL terms, one or more additional terms semantically related to the one or more SQL terms, and one or more DSL mapping rules configured to map SQL to DSL;

execute the DSL query on the enterprise data catalog to identify one or more results corresponding to the natural language query; and transmit the one or more results in the user interface.

16. The at least one non-transitory computer-readable medium of claim 15, wherein the instructions that, when executed by at least one of the one or more computing devices, cause at least one of the one or more computing devices to identify one or more nouns in the plurality of query terms further cause at least one of the one or more computing devices to:

applying named entity recognition to the plurality of query terms to determine a plurality of classification values corresponding to the plurality of query terms;

identifying the one or more nouns in the plurality of query terms based at least in part on the plurality of classification values.

17. The at least one non-transitory computer-readable medium of claim 15, wherein the instructions that, when executed by at least one of the one or more computing devices, cause at least one of the one or more computing devices to query an entity index based at least in part on the one or more nouns to identify one or more class entities corresponding to the one or more nouns and one or more class attributes corresponding to the one or more class entities further cause at least one of the one or more computing devices to:

querying the entity index with the one or more nouns to identify one or more class entities corresponding to the one or more nouns; and identifying the one or more class attributes corresponding to the one or more class entities in the entity index.

18. The at least one non-transitory computer-readable medium of claim 17, wherein the one or more nouns comprises a plurality of nouns and wherein the instructions that, when executed by at least one of the one or more computing devices, cause at least one of the one or more computing devices to query the entity index with the one or more nouns to identify one or more class entities corresponding to the one or more nouns further cause at least one of the one or more computing devices to:

querying the entity index with a first noun in the plurality of nouns to identify a first class entity corresponding to the first noun;

querying the entity index with a second noun in the plurality of nouns to identify two or more second class entities;

identifying a second class entity in the two or more second class entities as corresponding to the second noun based at least in part on one or more relationships between the second class entity and the first class entity in the entity graph.

19. The at least one non-transitory computer-readable medium of claim 15, wherein the instructions that, when executed by at least one of the one or more computing devices, cause at least one of the one or more computing devices to generate one or more structured query language (SQL) queries corresponding to the natural language query based at least in part on providing the one or more class entities and the one or more class attributes as context to a large language model (LLM) further cause at least one of the one or more computing devices to:

generating an SQL schema based at least in part on the one or more class entities and the one or more class attributes;

inputting the SQL schema as context to the LLM; and inputting the natural language query to the LLM with a prompt to translate the natural language query to SQL.

20. The at least one non-transitory computer-readable medium of claim 15, wherein the instructions that, when executed by at least one of the one or more computing devices, cause at least one of the one or more computing devices to transform the one or more SQL queries into one or more domain specific language (DSL) queries based at least in part on the one or more SQL terms, one or more additional terms semantically related to the one or more SQL terms, and one or more DSL mapping rules configured to map SQL to DSL further cause at least one of the one or more computing devices to:

generating the one or more additional terms based at least in part on semantic expansion of the one or more SQL terms, the semantic expansion being based at least in part on one or more of the entity graph, the entity index, or a metadata index generated based at least in part on the enterprise data catalog;

identifying one or more DSL entities in the enterprise data catalog corresponding to the one or more SQL terms or the one more additional terms based at least in part on one or more of semantic match probabilities or syntactic match probabilities; and generating the one or more DSL queries based at least in part on the one or more DSL entities and the one or more DSL mapping rules.

21. The at least one non-transitory computer-readable medium of claim 20, wherein the instructions that, when executed by at least one of the one or more computing devices, cause at least one of the one or more computing devices to generate the one or more additional terms based at least in part on semantic expansion of the one or more SQL terms further cause at least one of the one or more computing devices to perform one or more of:

generate at least one additional term that is semantically related to at least one SQL term based at least in part on the metadata index; or generate at least one additional term that is semantically related to at least one SQL term based at least in part on relationships in the entity graph.

\*      \*      \*      \*      \*